Dec. 19, 1967
C. HARRIS, JR
3,358,581
FOOD WARMING APPARATUS
Filed June 21, 1961
3 Sheets-Sheet 1
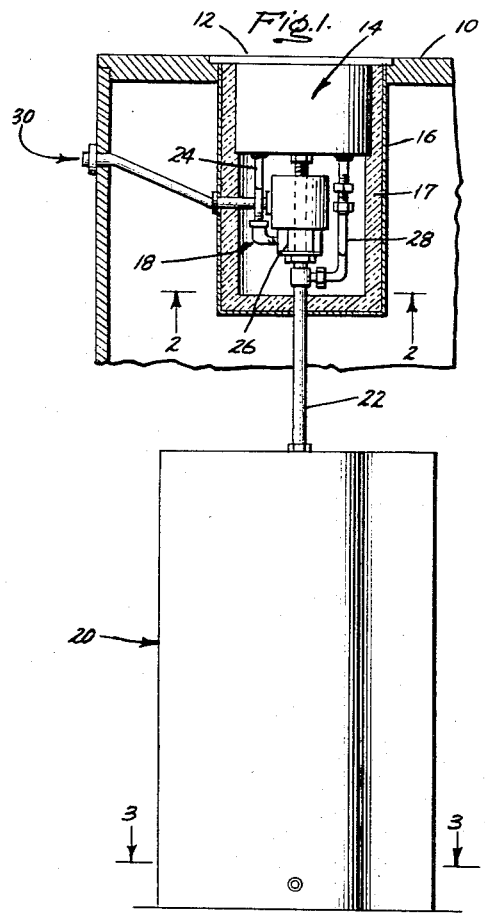
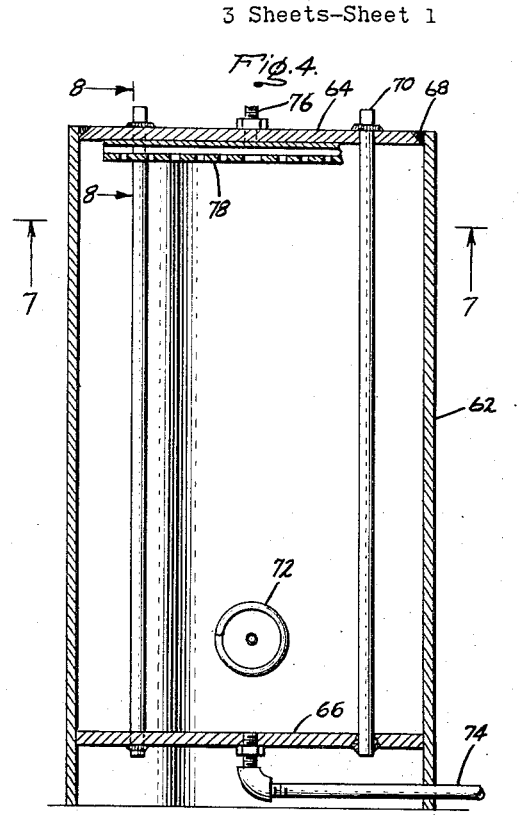
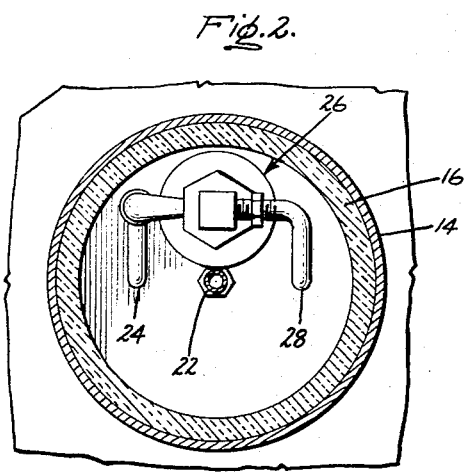
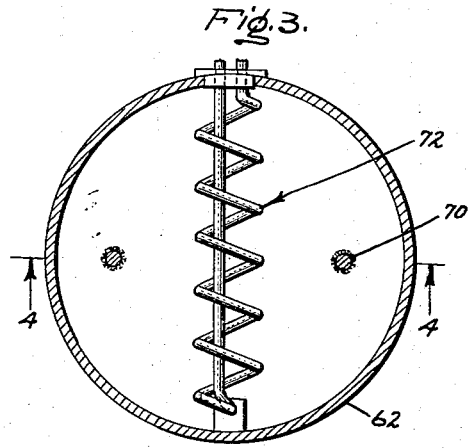
Inventor:
Charles Harris, Jr
by Just & Orish
Attorneys.

Dec. 19, 1967  C. HARRIS, JR  3,358,581
FOOD WARMING APPARATUS
Filed June 21, 1961  3 Sheets-Sheet 2
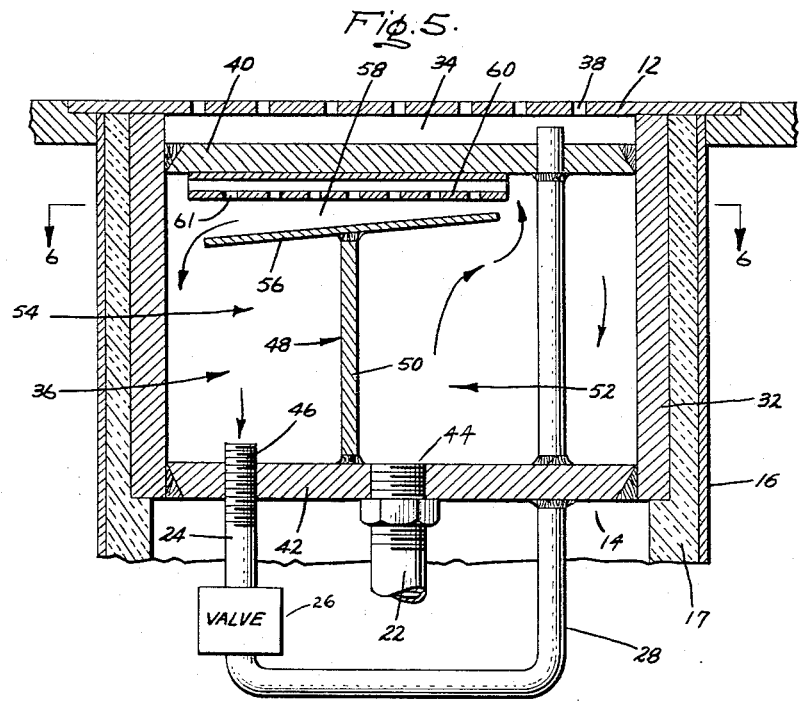
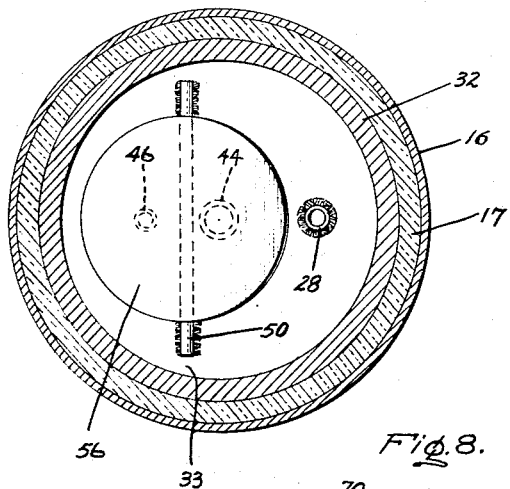
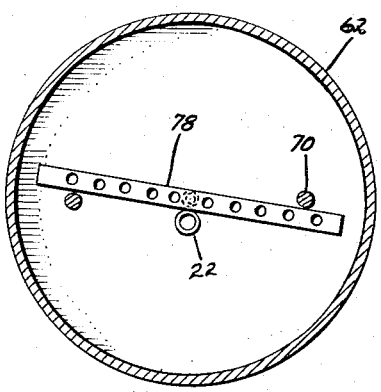
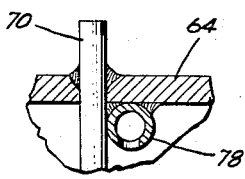
Inventor:
Charles Harris, Jr,
by Just Arish
Attorneys.

Dec. 19, 1967  C. HARRIS, JR  3,358,581
FOOD WARMING APPARATUS
Filed June 21, 1961  3 Sheets-Sheet 3
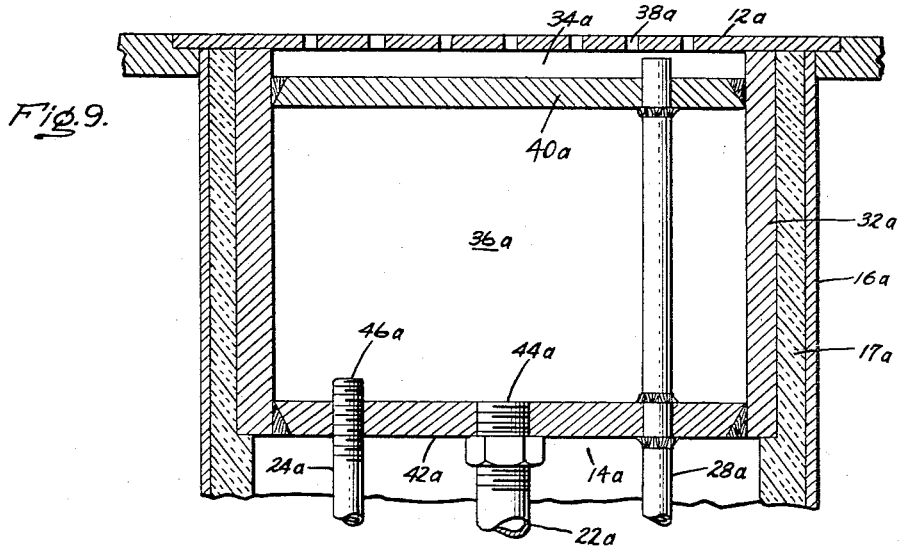
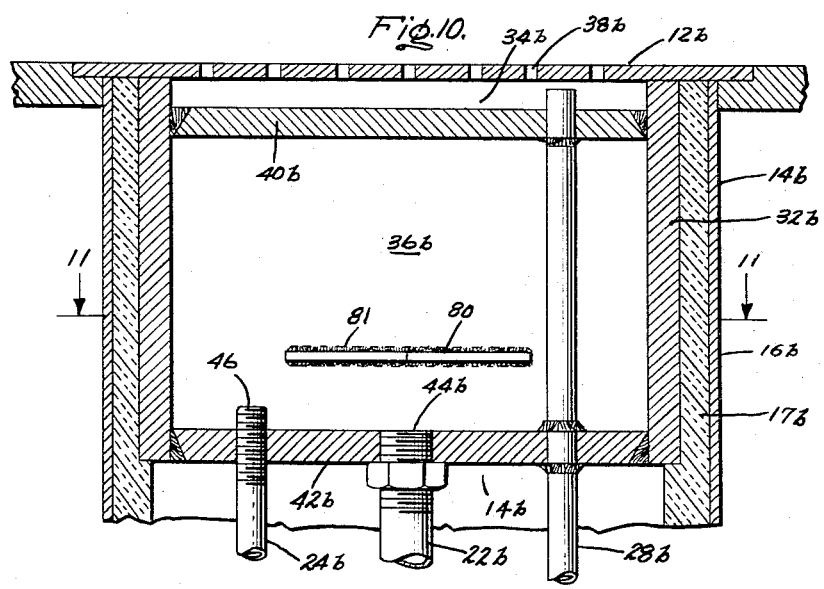
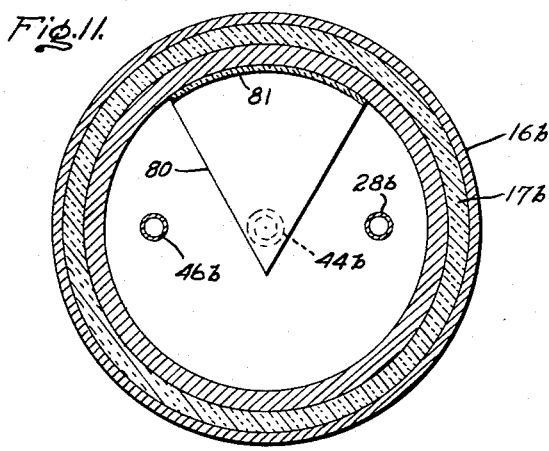
Inventor:
Charles Harris, Jr.
by Gust & Irish
Attorneys.

United States Patent Office 3,358,581
Patented Dec. 19, 1967

3,358,581
FOOD WARMING APPARATUS
Charles Harris, Jr., Peru, Ind., assignor to The Dewey-Shepard Boiler Co., Inc., Peru, Ind.
Filed June 21, 1961, Ser. No. 118,575
3 Claims. (Cl. 99—234)

This invention generally relates to apparatus for warming food products or the like involving the application thereto of dry steam, and more particularly to apparatus for warming and conditioning bread products, such as buns.

The apparatus of the present invention is concerned with the rapid conditioning of food products in establishments wherein such food products are dispensed to the consuming public at a rapid but variable rate of speed. More particularly, the problems solved by use of the apparatus of the present invention are common to lunch counter establishments wherein hamburger and frankfurter buns and the like must be maintained in large quantities before being actually used, thereby requiring some method for rendering the rolls warm and soft just before sale to the customer. The use of warming apparatus such as dry heaters, have proved unsatisfactory in that food products, in particular bread food products, are rendered brittle and dry in the attempt to restore their freshness. Steaming heads heretofore utilized have on the other hand proved unsatisfactory since they have rendered bread food products too soggy in attempting to restore the freshness thereto. Furthermore, the source of steam necessary continuously to operate steaming heads as heretofore utilized was either unduly large or became exhausted when least desirable. It is therefore desirable to provide food warming apparatus employing dry steam particularly suited for conditioning bread food products and characterized by its low steam consumption and resultant small capacity steam source, and thus its small space requirement. It is further desirable that such apparatus be simple, easily installed and maintained, and of relatively low cost.

It is therefore an object of this invention to provide improved food warming apparatus.

Another object of this invention is to provide improved food conditioning apparatus of the type employing steam.

A further object of the present invention is to provide improved steaming apparatus particularly suited for the conditioning of bread food products characterized by its low steam consumption, small capacity steam source and small space requirement.

Yet another object of the present invention is to provide a novel steaming head whereby the supply of steam thereto is conditioned to the proper degree of dryness before it is selectively ejected through apertures in the top plate of the steaming head for warming and conditioning food products placed thereon.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary side view, partly in section and partly broken away, of the steaming apparatus of the present invention installed in a typical location;

FIG. 2 is a cross-sectional view taken substantially through a plane indicated by section line 2—2 of FIG. 1;

FIG. 3 is a cross-sectional view taken substantially through a plane indicated by section line 3—3 of FIG. 1;

FIG. 4 is a cross-sectional view taken substantially through a plane indicated by section line 4—4 of FIG. 3;

FIG. 5 is an enlarged fragmentary cross-sectional view of the steaming head illustrated in FIG. 1 and showing the preferred embodiment of the invention;

FIG. 6 is a cross-sectional view taken substantially through a plane indicated by section line 6—6 in FIG. 5;

FIG. 7 is a cross-sectional view taken substantially through a plane indicated by section line 7—7 of FIG. 4;

FIG. 8 is a fragmentary cross-sectional view taken through a plane indicated by section line 8—8 of FIG. 4;

FIG. 9 is a fragmentary cross-sectional view similar to FIG. 5 but showing another embodiment of the invention;

FIG. 10 is a fragmentary cross-sectional view showing yet another embodiment of the invention; and FIG. 11 is a cross-sectional view taken substantially through a plane indicated by section line 11—11 in FIG. 10.

Referring now to FIGURES 1 through 8 of the drawings in detail, FIGURE 1 illustrates a typical installation for the preferred embodiment of the steaming apparatus of the present invention below a food dispensing counter top, generally referred to by reference numeral 10. Mounted flush with the top surface of the counter top 10 is the top plate member 12 of a steaming head, generally referred to by reference numeral 14, which is encircled by a tubular casing 16 connected to the plate member 12 and suspended therebelow, and having insulation 17 carried therewithin.

A control assembly generally referred to be reference numeral 18 is operatively connected to the steaming head 14 within the insulated casing 16 and disposed below the steaming head, whereby the steaming head 14 is supplied with steam from a miniature size steam generating boiler assembly generally referred to by reference numeral 20. It will be appreciated that the boiler 20 is of such size as to be stored below the counter top 10 and yet be of such capacity as to provide the continuous supply of steam that may be necessary in connection with the freshening of food products warmed by the steaming head 14.

The control assembly 18 is of conventional design and is provided for the purpose of selectively providing a charge of steam from the boiler 20 to the top plate 12 when it is desired to warm a bun for example. The steaming head 14 is therefore directly connected to the steam outlet of the boiler 20 by a conduit 22 while an outlet conduit 24 from the steaming head 14 is controllably connected by a solenoid operated valve mechanism 26 of control assembly 18 to a return conduit 28 by means of which a charge of dry steam is ejected through the top plate 12 as will hereafter be explained in further detail. Control over the solenoid operated valve may be exercised through a momentary type switch 30 for opening the valve mechanism 26 for a predetermined period of time in order to admit the charge of dry steam.

Referring now to FIGS. 5 and 6 in particular, it will be observed that the steam head assembly 14 is formed by an outer tubular member 32 within which there is formed a dry steam chamber 34 and a steam storing chamber generally referred to by reference numeral 36. The dry steam chamber 34 is defined between the top plate member 12 which has a plurality of apertures 38 therein through which dry steam is ejected, and a partition plate member 40 welded to the inner walls of the tubular member 32 in close spaced relation below the top plate member 12. Dry steam entering chamber 34 through conduit 28 will not only be ejected through the apertures 38 but will maintain the plate member 12 in heated condition for warming the food products.

The partition plate member 40 furthermore defines the upper end of the steam storing chamber 36, the lower end of which is formed by the bottom plate member 42 welded to the lower end of the tubular member 32. Raw steam from the boiler 20 is therefore supplied to the steam storing chamber 36 by the conduit 22 which is connected to the inlet 44 centrally located within the bottom plate member 42. The dry steam outlet conduit 24 on the other hand is connected to the dry steam outlet 46 spaced from the inlet 44 in the bottom plate member 42. The dry steam return conduit 28 selectively connected to the outlet conduit 24 through the control valve mechanism 26 of the control assembly 18, extends upwardly through the steam storing chamber by passage through both the bottom plate member 42 and the partition plate member 40. The conduit 28 is furthermore welded to said plate members 40 and 42 as clearly indicated in FIG. 5.

In order to insure that the steam admitted to the steam storing chamber 36 from the boiler 20 is in dry condition before being admitted to the dry steam chamber 34, a steam circulating and deflecting structure, generally referred to by reference numeral 48, is mounted within the stem storing chamber 36. The structure 48 includes a vertical partition member 50 which is welded at its lower end to the bottom plate member 42 and which extends vertically thereabove and laterally of the inlet 44 and outlet 46. The vertical partition member 50 terminates short of the internal walls of the tubular member 32 providing lateral passages 33 between a portion 52 of the chamber 36 on the inlet side of the vertical partition plate member 50 and the portion 54 on the outlet side of the member 50. Connected to the upper end of the vertical partition member 50 in spaced relation below the plate member 40, is a circular inclined deflecting member 56 defining thereabove a dry steam passage 58. Also preferably disposed within the dry steam passage 58 and connected to the underside of the partition plate member 40 is a conventional tubular steam scrubber element 60 which is provided with a plurality of apertures 61 on the bottom side thereof through which steam may pass. In the absence of steam scrubber 60 the steam in passage 58 will tend to condense on partition 40 ultimately causing oxidation and erosion thereof. Provision of scrubber 60 allows steam to condense within the tubular element and the resultant water to collect and drip out through the apertures 61. The scrubber 60 thus tends to attract condensation and also extracts and removes impurities from the steam before it finally enters chamber 54 and conduit 24.

As indicated by the arrows in FIG. 5, raw wet steam entering the chamber portion 52 from the boiler 20 through conduit 22 is confined thereto by the partition member 50, and is injected against the portion of the deflecting member 56 which extends above the inlet 44, the steam being deflected thereby to be circulated within the portion 52 of the chamber 36. As a result of the steam circulation within the portion 52, of the chamber 36, the cooler and wetter steam will force the hotter and drier steam upwardly into the dry steam passage 58, the cooler steam moving downwardly and condensing on the bottom plate member 42 with the condensate running back down conduit 22; it will be observed that conduit 24 extends into chamber 36 a sufficient distance to prevent the condensate from entering. It will also be observed that the steam from the boiler is deflected by deflecting member 56 against the wall of tubular member 32 thereby maintaining the same in a heated condition.

The dry steam in the dry steam passage 58 will move toward the chamber portion 54 by virtue of the inclination of the deflecting member 56 and will upon demand of the control valve mechanism 26 be delivered into the outlet conduit 24. Accordingly steam dried to the desired extent will be supplied by the conduit 28 to the dry steam chamber 34 before being ejected through the apertures 38. Any remaining moisture in the dry steam in passage 58 will be condensed in scrubber 60 and on the upper surface of deflecting member 56, the resulting condensate running off of member 56 by virtue of its inclination and falling to bottom plate 42 to be drained down conduit 22.

As hereinbefore indicated, it is of vital importance to provide a supply of steam for the steam head assembly 14 that will be commensurate with the demand for steam and yet not require spatially extensive steam generator in view of the restricted space available below the counter 10. The steam boiler 20 being constructed from a cylindrical drum 62 as illustrated in FIGS. 3 and 4, is closed at its upper end by outlet plate member 64 and at the lower end by a recessed bottom plate member 66, both of said plate members 64 and 66 being welded to the drum by externally applied welds 68. The steam pressure capacity of the enclosed boiler drum necessary to provide the supply of steam called for, is increased beyond that expected of the described construction by use of a plurality of stay rods 70. The stray rods 70 therefore extend through both the plate members 64 and 66 and are welded thereto on the axially outer ends of the plate members so as not to weaken the stay rods and to resist the increased steam pressure generated within the boiler. The boiler is therefore also provided with an immersion-type electric heater in direct contact with the water, generally referred to by reference numeral 72, and is supplied by water through the bottom plate member 66 by the supply conduit 74. The top plate member 64 is accordingly provided with steam outlet 76 which is connected to the steam supply conduit 22. Also connected to the top plate member 64 as more clearly seen in FIGS. 7 and 8, is a scrubber element 78 similar in construction and purpose to the scrubber element 60 as heretofore described in connection with the steaming head assembly 14. It will be readily understood that boiler 20 may be gas or oil fired by providing a tube extending transversely thereacross with a gas or oil burner positioned therein; an electrical heater may also be positioned in such a tube.

Referring now to FIG. 9 in which like elements are indicated by like reference numerals with the suffix "a," the circulating and deflecting structure 48 of the previous figures may be entirely omitted, as shown. Alternatively, a generally triangular, horizontally disposed baffle plate 80 may be provided in chamber 36b as shown in FIGS. 10 and 11 in which like elements are still indicated by like reference numerals with the suffix "b." Here, baffle 80 is secured to the wall of tubular member 32b, as by welding at 81, and covers the steam inlet 44b, as shown. Here, the raw steam from the boiler is injected by inlet 44b against baffle 80 which prevents the steam pressure from blowing any live condensate against the plate member 40b. Thus, any condensate which the velocity of the raw steam carries with it is mechanically deflected by baffle 80 to the bottom of the chamber for draining back into the boiler through line 22b. The steam scrubber 60 of FIG. 5 may be omitted as shown in FIGS. 9 and 10.

From the foregoing description, operation and utility of the steaming apparatus of the present invention will be apparent. As a result of the use of the improved miniature steam generator 20 and the improved action of the novel steaming head 14, a continuous and reliable supply of dry steam is made available for the particular purposes hereinbefore indicated and also within the installational restrictions applicable.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is:
1. A steaming head assembly for warming food products comprising a vertically disposed tubular casing member having open upper and lower ends, an apertured plate member extending across said upper end of said casing member, a first plate member extending across said casing member spaced from said apertured plate member and defining a dry steam chamber therewith, another plate member extending across said casing member spaced from said first plate member and defining a steam storage chamber therewith, a raw steam inlet conduit extending through said other plate member for introducing steam to said storage chamber from a source of steam supply, a steam outlet conduit extending through and above said other plate member and spaced from said raw steam inlet passage, a dry steam inlet conduit extending through both of said plate members and spaced from said raw steam inlet conduit for introducing dry steam into said dry steam chamber, a control valve disposed on the side of said other plate member remote from said steam storage chamber and connecting said steam outlet conduit to said dry steam inlet conduit for selectively admitting steam from said steam storage chamber to said dry steam chamber, and a generally horizontally disposed baffle plate member in said steam storage chamber having an edge secured to said tubular member, said baffle member being spaced from said other plate member and extending over said raw steam inlet conduit for deflecting steam injected thereby into said storage chamber and circulating the steam therein, said baffle member being generally triangular with the apex thereof extending over said raw steam inlet conduit to the exclusion of said outlet conduit.

2. A steaming head assembly for warming food products comprising a vertically disposed tubular casing member having open upper and lower ends, an apertured plate member extending across said upper end of said casing member, a first plate member extending across said casing member spaced from said apertured plate member and defining a dry steam chamber therewith, another plate member extending across said casing member spaced from said first plate member and defining a steam storage chamber therewith, a raw steam inlet conduit extending through said other plate member for introducing steam to said storage chamber from a source of steam supply, a steam outlet conduit extending through and above said other plate member and spaced from said raw steam inlet passage, a dry steam inlet conduit extending through both of said plate members and spaced from said raw steam inlet conduit for introducing dry steam into said dry steam chamber, a control valve disposed on the side of said other plate member remote from said steam storage chamber and connecting said steam outlet conduit to said dry steam inlet conduit for selectively admitting steam from said steam storage chamber to said dry steam chamber, a partition member having top, bottom and side edges, said partition member being disposed in said storage chamber with said bottom edge secured to said other plate member and extending transversely of said raw steam inlet conduit and said outlet conduit, said partition member extending vertically with its side edges spaced from said casing member, and a deflecing plate member secured to the top edge of said partition member and spaced from said first plate member to define a dry steam passage, said deflecting plate member extending over said raw steam inlet conduit and said outlet conduit and being inclined toward the latter.

3. The combination of claim 2 further comprising a steam scrubber in said dry steam passage and secured to said first plate member.

References Cited
UNITED STATES PATENTS

| | | | |
|---|---|---|---|
| 176,524 | 4/1876 | Elmore | 126—369 X |
| 273,913 | 3/1883 | Timby | 126—369 |
| 562,888 | 6/1896 | Cookson | 126—379 |
| 616,095 | 12/1898 | Foerg | 126—369 |
| 2,181,434 | 11/1939 | Lewis et al. | |
| 2,617,349 | 11/1952 | Tucker | 99—234 |
| 2,620,789 | 12/1952 | Gregory. | |
| 2,973,705 | 3/1961 | Klemm | 99—234 |

WALTER A. SCHEEL, *Primary Examiner.*

E. HOROWITZ, *Assistant Examiner.*